March 21, 1961 E. G. BUEHLER 2,976,129
CHLORINATORS FOR SWIMMING POOLS
Filed May 28, 1959 2 Sheets-Sheet 1
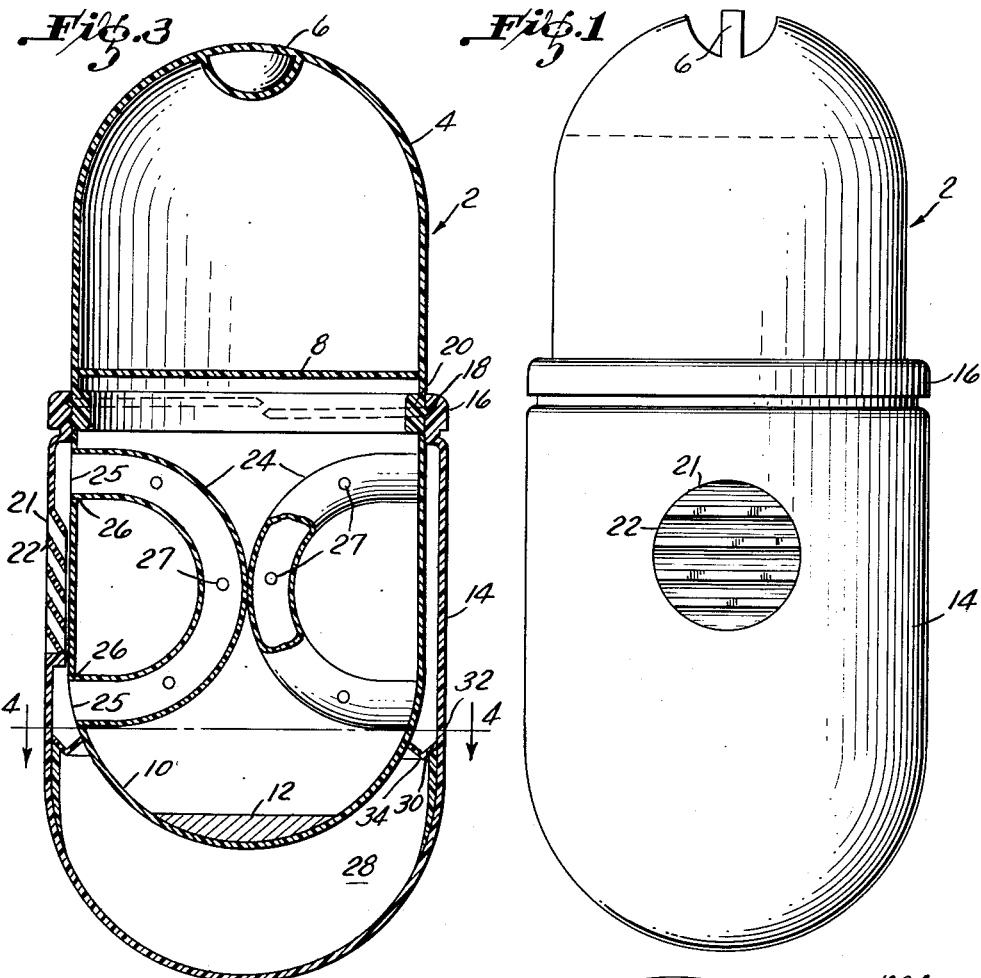
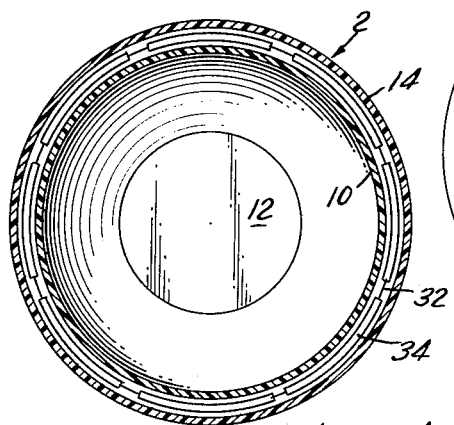
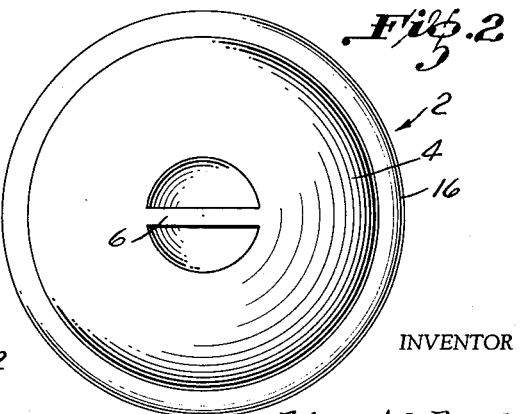
INVENTOR
Edward G. Buehler
BY James H. Littlepage
ATTORNEY March 21, 1961 E. G. BUEHLER 2,976,129
CHLORINATORS FOR SWIMMING POOLS
Filed May 28, 1959 2 Sheets-Sheet 2
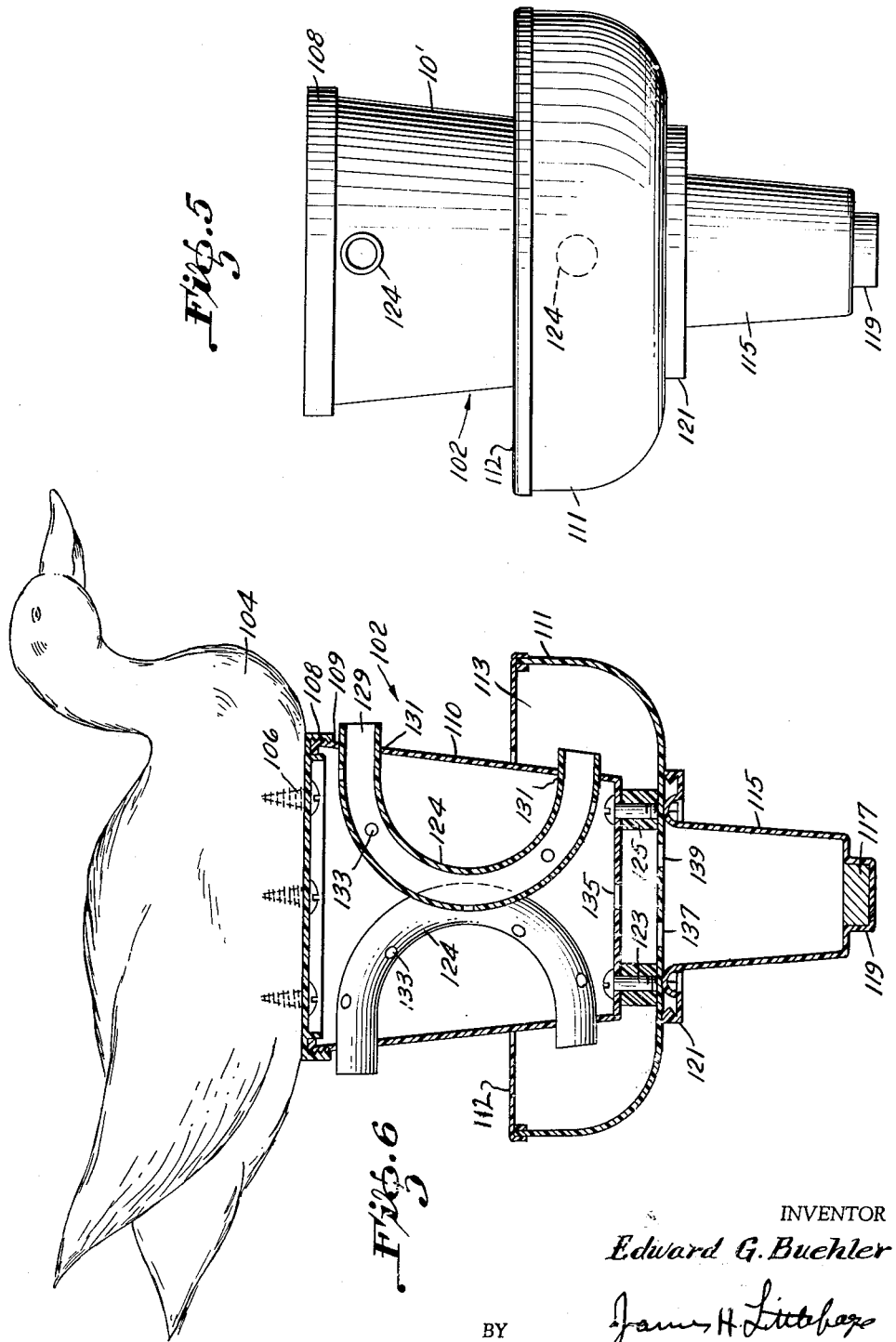
INVENTOR
Edward G. Buehler
BY
ATTORNEY

United States Patent Office 2,976,129
Patented Mar. 21, 1961

2,976,129

CHLORINATORS FOR SWIMMING POOLS

Edward G. Buehler, 313 Merchandise Mart Bldg., Honolulu, Hawaii

Filed May 28, 1959, Ser. No. 816,568

6 Claims. (Cl. 23—267)

This invention relates to chlorinators for swimming pools and, more particularly, to chlorinator floats having sediment traps.

Heretofore, various perforated containers and floats have been devised for dissolving chlorine crystals in swimming pools. When most of the chlorine has been leached out of the crystals, a gritty, granular residue remains, and when the perforations are sufficiently large to permit the desired circulation of water through the container, the residue washes out through the perforations. The gritty residue settles on the swimming pool bottom and is uncomfortable to feel, as well as hazardous to the eyes and ears, and gives the pool an unsightly, dirty appearance resembling sand on the bottom of the pool.

The object now is to provide chlorinator floats having provisions for controlling the circulation of water and free chlorine therethrough, and having traps for collecting and retaining the granular residue which washes out of the containers into the trap.

These and other objects will be apparent from the following specification and drawings, in which:

Fig. 1 is a side elevation of a float which constitutes one form of the invention;

Fig. 2 is a plan view of the float shown in Fig. 1;

Fig. 3 is a vertical cross-section through the center of the float shown in Figs. 1 and 2;

Fig. 4 is a horizontal cross section along the lines 4—4 of Fig. 3;

Fig. 5 is a side elevation of a chlorine container and sediment trap which constitutes a second embodiment of the invention; and, Fig. 6 is a vertical cross section through the embodiment shown in Fig. 5, and further illustrating the same attached on the bottom of a duck-figure float.

Referring now to the drawings, in which like reference numerals denote similar elements, the embodiment illustrated in Figs. 1 to 4, inclusive, comprises a plastic float 2 having a hollow cap 4, preferably with some means, such as anchor strip 6, for anchoring a tether string. A partition 8 may be provided for sealing air within cap 4, although it has been found that the partition is not vital, and that the float is sufficiently buoyant because of air trapped within cap 4, in the manner that air is trapped within a diving bell.

A cup-shaped chlorine receptacle 10 is disposed below cap 4 and provided with a ballast weight 12 of heavy metal for maintaining the float upright. Chlorine receptacle 10 is supported within a hollow outer shell 14, the upper edge of receptacle 10 tightly but removably engaging within a relatively thick rim 16 which is secured by threads 18 to the periphery of an inwardly thickened band 20. Three ports 21, spaced 120° apart, and having inwardly and downwardly inclined louvers 22 are provided for circulation of water throughout the interior of shell 14, it being understood that windows 21 are below the water-line of the float.

Disposed inwardly of windows 21 are three U-shaped tubes 24 having their open ends 25 mounted in openings 26 in the side wall of receptacle 10. Tubes 24 are perforated, as at 27, to permit the water which enters their open ends 25 to circulate freely throughout the mass of chlorine crystals (not shown) with which receptacle 10 is filled.

It should be noted that the lower portion of shell 14 is spaced below receptacle 10 so as to provide a trap chamber 28 therebetween. On a ledge 30 within shell 14 is affixed a V-section trough-like partition 32 whose inner edge engages and supports receptacle 10 at the start of the turn of its bottom, and just below the lower ends of tubes 24. Slots 34 in partition 32 permit the gritty residue to fall into trap chamber 28.

In operation, when receptacle 10 is filled with chlorine crystals or the like sterilizing compound, and float 2 is tethered in a swimming pool, water circulates between the louvers 22 of windows 21, into the interiors of shell 14, and thence through tubes 24 and perforations 27 throughout the interior of the mass of chlorine crystals in receptacle 10. Since tubes 24 are within the interior of the crystal mass, all tendency for the mass to cake is avoided. Most of the granular residue which washes out of receptacle 10 falls by gravity from the lower ends of the tubes and drops through slots 34 in partition 32. The downward and inward inclination of louvers 22 causes any free-floating granules to drift downwardly and inwardly. When the supply of chlorine crystals is dissolved, the float is opened by unscrewing shell 14 from cap 4, and the sediment deposited in trap chamber 28 may be dumped after receptacle 10 is lifted out of shell 14.

Referring now to Figs. 5 and 6, the chlorine dispenser illustrated therein operates on the same principles as the one previously detailed. However, a float of different form, such as the duck figure 104 is secured, as by screws 106 to a cap 108. Floats of various form may be similarly attached or wired to the dispenser, so long as the plastic chlorine receptacle 110, to which cap 108 is attached by threads 109, is immersed. A saucer-shaped pan 111 having a lid 112 is disposed below receptacle 110, the skirt of the pan forming a trough 113 around the lower end of receptacle 110.

A residue trap 115 is mounted on the underside of pan 111, and a ballast weight 117 in the bottom 119 of trap 115 maintains the assembly upright. The upper edge of trap 115 is formed with a sealing flange 121 which engages against the underside of pan 111, the trap, pan and receptacle being held together by screws 123. Bushings 125 space the bottom of pan 111 below the bottom of receptacle 110. Three plastic U-tubes 124, spaced 120° apart, are mounted within receptacle 110, their open ends 129 projecting through openings 131 in the side wall of the receptacle. Tubes 124 are perforated, as at 133 to permit water to circulate through the mass of chlorine crystals (not shown) with which the receptacle is filled. An additional hole 135 in the bottom of receptacle 110 permits some of the concentrated solution to flow downwardly and then out from the receptacle, and holes 137 are provided in the bottom of pan 111 to permit granular residue to fall into trap 115.

In operation of the Figs. 5 and 6 embodiment, water entering through tubes 124 and perforations 133 circulates through the central portion of the mass of crystals in receptacle 110 and the solution formed as the crystals dissolve passes out via tubes 124 and hole 135. Gritty sediment, which washes out with the solution, falls by gravity into trough 113 and through holes 137 into trap 115. Trap 115 may be cleaned by removing the device from the pool, up-ending it, and washing with a garden hose.

The invention is not limited to the specific forms de-

I claim:
1. In a device for dissolving and dispensing in a swimming pool a solution dissolved from crystals of chlorine or the like sterilizing compound, a receptacle for a mass of said crystals, said receptacle having upper and lower ends and a side wall, buoyant means for floating said receptacle upright in a pool of water, a plurality of U-shaped tubes each having open upper and lower end portions respectively engaged in upper and lower openings in the side wall of said receptacle, said tubes having perforate bight portions disposed within said receptacle for circulating ambient water throughout the interior of said mass, and catch basin means including an upwardly open trough disposed around said receptable adjacent and extending outwardly from the lower ends of said tubes for catching gritty residue issuing therefrom.

2. In a device for dissolving and dispensing in a swimming pool a solution dissolved from crystals of chlorine or the like sterilizing compound, a receptacle for a mass of said crystals, said receptacle having upper and lower ends and a side wall, buoyant means for floating said receptacle upright in a pool of water, a plurality of U-shaped tubes each having open upper and lower end portions respectively engaged in upper and lower openings in the side wall of said receptacle, said tubes having perforate bight portions disposed within said receptacle for circulating ambient water throughout the interior of said mass, catch basin means defining an upwardly open trough disposed around said receptacle beneath and extending outwardly from the lower ends of said tubes for catching gritty residue issuing from the open ends of said tubes, and means defining a trap chamber disposed beneath the catch basin means, said catch basin means having at least one opening therethrough for permitting said residue to fall into said trap chamber.

3. A device for dissolving and dispensing in a swimming pool a solution dissolved from crystals of chlorine or the like sterilizing compound which, upon dissolving, leaves a gritty residue comprising a float, a receptacle for a mass of said crystals, said receptacle having an upper end attached beneath said float, a side wall extending downwardly from said float, and a bottom at the lower end of said side wall, a plurality of vertically disposed U-shaped tubes each having open upper and lower end portions respectively engaging through upper and lower openings in said side wall, and having perforate bight portions disposed in said receptacle, a shell having an upper portion engaging the upper portion of said receptacle and having a side wall and bottom surrounding and spaced from the exterior of the side wall and bottom of said receptacle, and aperture means in the side wall of said shell laterally opposite said tubes for permitting ambient water to circulate through said tubes, the space between the bottoms of said receptacle and shell constituting a trap chamber for residue washing from the open ends of said tubes.

4. The combination claimed in claim 3, said aperture means comprising louvered windows having horizontally disposed, inwardly and downwardly inclined louvers therein.

5. The combination claimed in claim 3, and an upwardly open V-shaped annular trough surrounding said receptacle below the lower ends of said tubes and disposed between the side walls of said receptacle and shell, said trough having openings through the bottom thereof for permitting said residue to fall therethrough into said trap chamber.

6. A device for dissolving and dispensing in a swimming pool a solution dissolved from crystals of chlorine or the like sterilizing compound a float, a receptacle for a mass of said crystals, said receptacle having upper and lower ends and a side wall, means on the upper end of said receptacle for attaching the same to the float, a plurality of U-shaped tubes each having open upper and lower end portions respectively engaged through upper and lower openings in the side wall of said receptacle, said tubes having perforate wall bight portions disposed within said receptacle for circulating ambient water throughout the interior of said mass, an upwardly open cup-shaped member mounted beneath the lower end of said receptacle, the upper portion of said member defining a trough disposed around said receptacle and surrounding the lower ends of said tubes for catching gritty residue issuing from the open lower ends of said tubes, and means defining a trap chamber disposed beneath the member, said member having at least one opening therethrough for passing said residue into said trap chamber.

References Cited in the file of this patent

UNITED STATES PATENTS

| 1,647,809 | Neumann | Nov. 1, 1927 |
| 2,148,180 | Teigen | Feb. 21, 1939 |
| 2,761,562 | Moody | Sept. 4, 1956 |
| 2,826,484 | Buehler | Mar. 11, 1958 |
| 2,874,032 | Kuehner | Feb. 17, 1959 |
| 2,950,959 | Ve Relle | Aug. 30, 1960 |

FOREIGN PATENTS

| 2,747 | Great Britain | July 5, 1876 |